(12) United States Patent
Park et al.

(10) Patent No.: US 9,005,800 B2
(45) Date of Patent: Apr. 14, 2015

(54) BATTERY MODULE

(75) Inventors: Shi-Dong Park, Yongin-si (KR);
Tae-Yong Kim, Yongin-si (KR);
Jang-Wook Lee, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 451 days.

(21) Appl. No.: 13/077,940

(22) Filed: Mar. 31, 2011

(65) Prior Publication Data
US 2012/0114991 A1   May 10, 2012

(30) Foreign Application Priority Data
Nov. 10, 2010   (KR) ........................ 10-2010-0111464

(51) Int. Cl.
| | | |
|---|---|---|
| *H01M 2/24* | (2006.01) | |
| *H01M 6/42* | (2006.01) | |
| *H01M 2/12* | (2006.01) | |
| *H01M 2/10* | (2006.01) | |
| *H01M 2/20* | (2006.01) | |
| *H01M 2/34* | (2006.01) | |
| *H01M 10/04* | (2006.01) | |

(52) U.S. Cl.
CPC .............. *H01M 2/12* (2013.01); *H01M 2/1077* (2013.01); *H01M 2/206* (2013.01); *H01M 2/347* (2013.01); *H01M 10/0413* (2013.01)

(58) Field of Classification Search
CPC combination set(s) only.
See application file for complete search history.

(56) References Cited

U.S. PATENT DOCUMENTS

2010/0266887 A1*   10/2010   Sekino et al. ................. 429/123

FOREIGN PATENT DOCUMENTS

| JP | 2002-134078 | | 5/2002 |
|---|---|---|---|
| JP | 2002134078 A | * | 5/2002 |
| JP | 3121022 U | | 4/2006 |
| JP | 2008-270033 | | 11/2008 |
| JP | 2010-055882 | | 3/2010 |
| JP | 2010055882 A | * | 3/2010 |
| JP | 2010-205509 | | 9/2010 |
| JP | 2010205509 A | * | 9/2010 |
| KR | 10-2002-0092879 A | | 12/2002 |
| KR | 10-2004-0110921 A | | 12/2004 |
| KR | 1020040110921 A | * | 12/2004 |
| KR | 10-2010-0055477 A | | 5/2010 |

OTHER PUBLICATIONS

KIPO Office action dated Apr. 28, 2012 for priority KR Application No. 10-2010-0111464 (5 pages).
English Machine Translation of JP 2010-055882; 8 pages.
English Machine Translation of JP 2008-270033; 8 pages.

* cited by examiner

*Primary Examiner* — Ula C Ruddock
*Assistant Examiner* — Daniel Gatewood
(74) *Attorney, Agent, or Firm* — Christie, Parker & Hale, LLP

(57) ABSTRACT

The described technology relates generally to a high capacity battery module. The battery module according to an exemplary embodiment includes a plurality of rechargeable batteries configured to comprise electrode terminals externally protruded and identification units disposed on the peripheries of the electrode terminals, a bus bar configured to electrically connect the electrode terminals of the plurality of neighboring rechargeable batteries, and a protection member disposed between the plurality of rechargeable batteries and the bus bars.

16 Claims, 7 Drawing Sheets

BATTERY MODULE

CROSS-REFERENCE TO RELATED APPLICATION

This application claims priority to and the benefit of Korean Patent Application No. 10-2010-0111464 filed in the Korean Intellectual Property Office on Nov. 10, 2010, the entire contents of which are incorporated herein by reference.

BACKGROUND

1. Field

The described technology relates generally to a battery module.

2. Description of Related Art

A rechargeable battery can be discharged and recharged unlike a primary battery which is not rechargeable. The rechargeable battery can repeatedly perform a charge process of transforming external electrical energy into chemical energy and storing the chemical energy and a discharge process of transforming the chemical energy into electrical energy.

A typical example of a rechargeable battery may include a nickel hydrogen battery, a nickel cadmium battery, a lithium ion battery, a lithium polymer battery and so on. A rechargeable battery of a low capacity is widely used in small portable electronic devices, such as mobile phones, laptop computers, and camcorders. A high capacity rechargeable battery is often used to power a motor, such as for hybrid vehicles, a battery for storing electric power, and the like.

A high-power rechargeable battery using a non-aqueous electrolyte of a high energy density has recently been developed. The high-power rechargeable batteries may be coupled in series to form a high capacity battery module which may be used in devices requiring high power, such as electric vehicles and hybrid vehicles.

In order to electrically connect the plurality of rechargeable batteries as described above, bus bars are used to connect electrode terminals to the respective rechargeable batteries. In general, the electrode terminal externally protrudes from the rechargeable battery. The electrode terminals are connected in series in such a way as to connect the positive terminal of one rechargeable battery to the negative terminal of the other rechargeable battery adjacent to the one rechargeable battery.

However, occasionally during the assembly process of the battery module the rechargeable batteries are erroneously arranged and thus miss-insertion is generated, resulting in abnormalities, such as undesired high power. Furthermore, in case where the electrode terminal of each rechargeable battery is checked in the assembly process of the electrode module in order to eliminate such failure, there are problems in that the process time becomes long and productivity is deteriorated.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a battery module capable of preventing the misalignment of rechargeable batteries in the assembly process of the battery module.

A battery module according to an exemplary embodiment of the present invention includes a plurality of rechargeable batteries, each of the rechargeable batteries including a case, electrode terminals protruding from the case, and an identification unit extending around a periphery of at least one of the electrode terminals; a bus bar electrically coupling one electrode terminal of a first battery of the rechargeable batteries and one electrode terminal of a second battery of the rechargeable batteries, wherein the first battery and the second battery are adjacent; and a protection member located between the rechargeable batteries and the bus bar.

In one embodiment, the electrode terminals include a positive terminal and a negative terminal, wherein the identification unit comprises a positive identification unit extending around the periphery of the positive terminal and a negative identification unit extending around the periphery of the negative terminal, and wherein the positive identification unit and the negative identification unit are different colors or have different patterns from each other. In one embodiment, the identification unit extends around the periphery of only one of the positive terminal and the negative terminal. For example, the identification unit may include adhesive tape.

In one embodiment, the protection member includes a support plate covering a face of each of the rechargeable batteries and a plurality of terminal holes, wherein at least one of the electrode terminals penetrates one of the terminal holes. The protection member may also include protrusion units, wherein one protrusion unit extends around a periphery of at least one bus bar on the support plate, and a reinforcement protrusion extending adjacent an edge of the support plate.

In one embodiment, the support plate has exhaust holes that each communicate with at least one vent member on each of the rechargeable batteries. Additionally, the terminal hole may have a greater diameter than a diameter of each of the electrode terminals and a terminal fastening member fastening the electrode terminal to the support plate. Further, in one embodiment, the support plate has a window adjacent to the terminal holes, wherein the window generally corresponds to one of the identification units.

In one embodiment, the positive terminal of a first battery of the rechargeable batteries and the negative terminal of a second battery of the rechargeable batteries adjacent to the first battery are adjacent to each other. Additionally, a bus bar may electrically connect the positive terminal of the first battery and the negative terminal of the second battery. In another embodiment, the plurality of rechargeable batteries are arranged such that the positive terminal of a first two adjacent ones of the rechargeable batteries are adjacent to each other and the negative terminal of a second two adjacent ones of the rechargeable batteries are adjacent to each other.

In accordance with an exemplary embodiment of the present invention, in the assembly process of a battery module, the misalignment of rechargeable batteries can be suppressed.

Further, a short between the bus bars of a battery module can be prevented, thereby being capable of securing stability.

Further, the productivity of a battery module can be improved because the time that it takes to assemble the battery module is reduced.

DETAILED DESCRIPTION OF THE EMBODIMENTS

The present invention will be described more fully hereinafter with reference to the accompanying drawings, in which some exemplary embodiments of the invention are shown. As those skilled in the art would realize, the described embodiments may be modified in various different ways, all without departing from the spirit or scope of the present invention. In order to clarify a description of the present invention, parts not related to the description are omitted, and the same reference numbers are used throughout the drawings to refer to the same or like parts.

Throughout this specification and the claims that follow, when it is described that one element is "coupled" (or "connected") to another element, the one element may be directly physically coupled (or directly physically connected) to the other element or electrically coupled (or electrically connected) to the other element through a third element.

Figure 1:
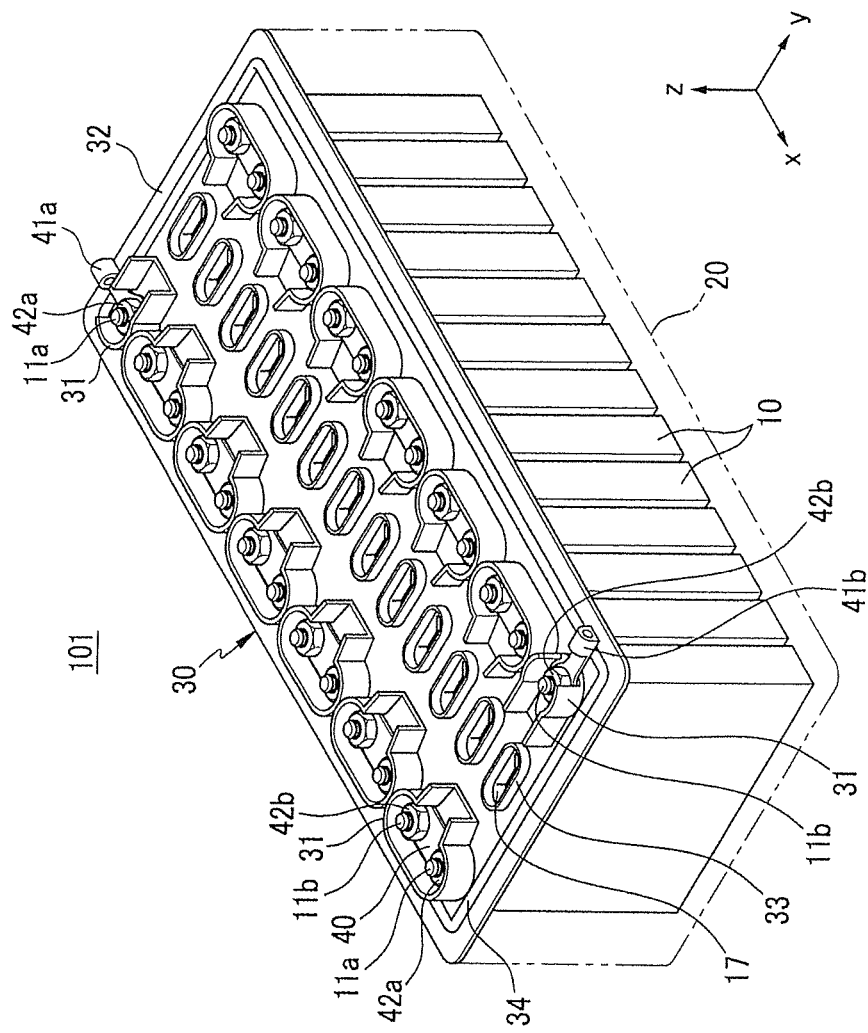
FIG. 1 is a perspective view of a battery module according to a first exemplary embodiment of the present invention.
Figure 2:
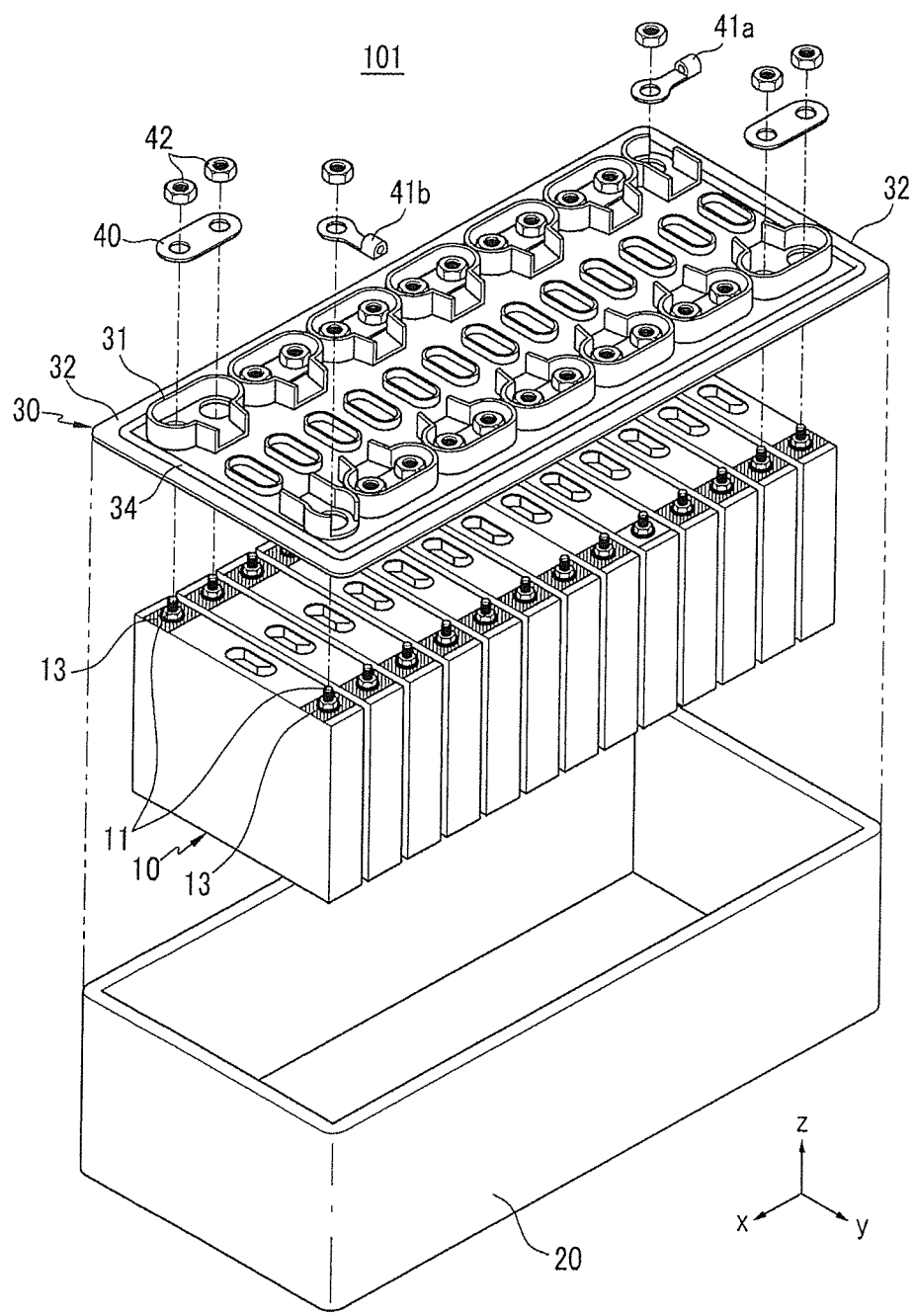
FIG. 2 is an exploded perspective view of the battery module according to the first exemplary embodiment of the present invention.
Figure 3:
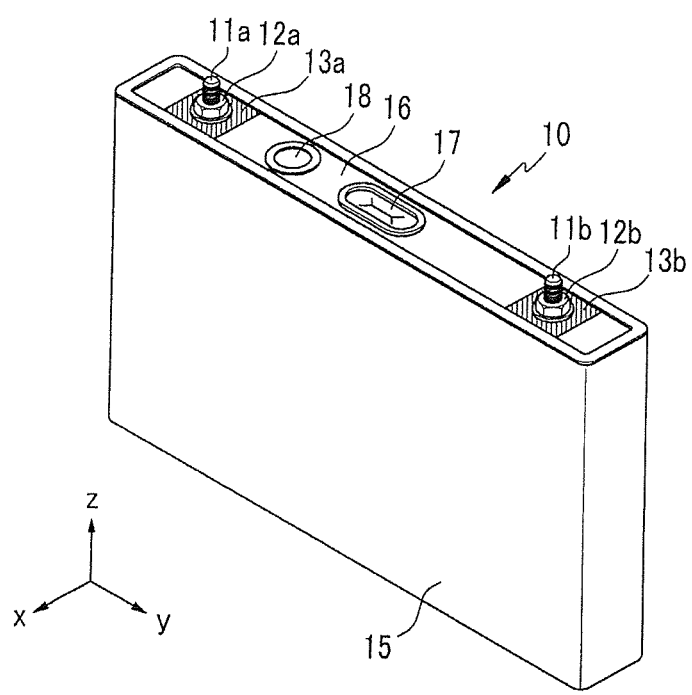
FIG. 3 is a perspective view of a battery of the battery module according to the first exemplary embodiment of the present invention.
Figure 4:
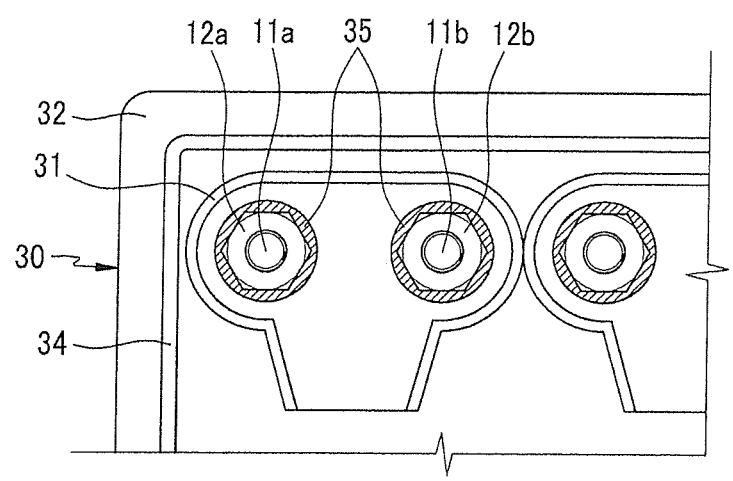
FIG. 4 is a partial top plan view showing a bus bar mounted on the battery module according to the first exemplary embodiment of the present invention.

FIG. 1 is a perspective view of a battery module according to a first exemplary embodiment of the present invention, and FIG. 2 is an exploded perspective view of the battery module according to the first exemplary embodiment of the present invention. Furthermore, FIG. 3 is a perspective view of the battery of the battery module according to the first exemplary embodiment of the present invention, and FIG. 4 is a partial top plan view showing a state in which a bus bar is mounted in the battery module according to the first exemplary embodiment of the present invention.

In the present exemplary embodiment, an example in which a rechargeable battery 10 is a lithium ion battery and configured to have a hexahedral shape is described. However, the present invention is not limited thereto, and the rechargeable battery 10 may be a lithium polymer battery or the like and may be configured to have various forms, such as a cylindrical shape.

Referring to FIGS. 1 and 2, the battery module 101 according to the present exemplary embodiment includes a plurality of the rechargeable batteries 10, a housing 20 configured to accommodate the rechargeable batteries 10, a protection member 30 located on one side (e.g., the upper side) of the plurality of rechargeable batteries 10, and bus bars 40 configured to connect the plurality of rechargeable batteries 10.

The plurality of rechargeable batteries 10 are arranged in a line (i.e., stacked) along one direction (e.g., an x direction), and each of the rechargeable batteries 10 includes an electrode terminal 11 protruding from a case.

The construction of the rechargeable battery 10 is described in detail below with reference to FIG. 3. The rechargeable battery 10 according to the present exemplary embodiment includes an electrode assembly, a casing 15 accommodating the electrode assembly, and a cap plate 16 covering the opening of one side of the casing 15. The rechargeable battery 10 further includes the electrode terminal 11 configured to penetrate the cap plate 16 and protrude therefrom, lower fastening members 12a and 12b of the electrode terminal, and an identification unit 13 located near the electrode terminal 11.

The electrode terminal 11 includes a positive terminal 11a connected to the positive pole of the electrode assembly and a negative terminal 11b connected to the negative pole of the electrode assembly. The electrode terminal 11 outputs current, generated by an electrochemical reaction of the electrode assembly and an electrolyte solution within the casing 15, through the positive terminal 11a and the negative terminal 11b.

The lower fastening members 12a and 12b of the electrode terminal function to fix the electrode terminal 11 within a hole formed in the cap plate 16, and in one embodiment, as shown, they are nuts.

In accordance with the present exemplary embodiment, the identification unit 13 is located near the electrode terminal 11. The identification unit 13 includes a positive identification unit 13a located near the positive terminal 11a and a negative identification unit 13b located near the negative terminal 11b. In one embodiment, the positive identification unit 13a and the negative identification unit 13b are formed in different colors. For example, the positive identification unit 13a may be formed in red and the negative identification unit 13b may be formed in black so that the polarity of the electrode terminal 11 can be easily distinguished when the rechargeable battery 10 is assembled.

However, the positive identification unit 13a and the negative identification unit 13b may be formed of any two different colors so that they can be easily distinguished. The positive identification unit 13a and the negative identification unit 13b may also be formed in different patterns that can be visually differentiated. Alternatively, the identification unit may be formed on only one of the positive terminal 11a and the negative terminal 11b of the electrode terminal 11 so that the positive terminal 11a and the negative terminal 11b can be distinguished from each other.

The identification unit 13 may be formed by attaching a tape having color or a pattern onto the cap plate 16. However, the present invention is not limited thereto, and the identification unit 13 may be formed using various methods, such as a method of coloring the periphery of the electrode terminal 11.

The rechargeable battery 10 according to the present exemplary embodiment may further include a vent member 17 and an electrolyte solution injection member 18 which are formed on the cap plate 16. A notch openable at a threshold pressure is formed in the vent member 17 and allows gas generated within the rechargeable battery 10 to be discharged through the notch. An electrolyte solution can be injected into the rechargeable battery 10 through the electrolyte solution injection member 18.

Referring back to FIGS. 1 and 2, the plurality of rechargeable batteries 10 is arranged such that the positive terminals 11a and the negative terminals 11b are alternately located in a direction (e.g., an x direction) in which the rechargeable batteries 10 are arranged and accommodated in the housing 20. The protection member 30 is located on the upper side of the rechargeable batteries 10. More particularly, an opening is formed in one side of the housing 20, and the rechargeable batteries 10 are accommodated through the opening. The protection member 30 covers the opening of the housing 20 and covers one face on which the electrode terminals 11 of the rechargeable batteries 10 are formed.

The protection member 30 is located on the upper side of the rechargeable batteries 10 and is configured to protect the rechargeable batteries 10 and to stably support and protect the bus bars 40 connecting the neighboring rechargeable batteries 10. The construction of the protection member 30 is described in detail below with reference to FIGS. 1, 2, and 4.

The protection member 30 includes a support plate 32 acting as the body of the protection member 30, protrusion units 31 formed on the support plate 32, and a reinforcement rib 34. The support plate 32 is formed as an approximately square or rectangular plate and is coupled to the housing 20 using bolts after being installed in the opening of the housing 20.

Terminal holes 35 and exhaust holes 33 are formed in the support plate 32. The terminal hole 35 is formed at a position generally corresponding to the electrode terminal 11 of the rechargeable battery 10 located under the protection member 30 and the electrode terminal protrudes through the terminal hole 35. The exhaust hole 33 is formed to communicate with the vent member 17 of the rechargeable battery 10 and is configured to discharge internal gases of the rechargeable battery 10 externally through the vent member 17. In the present exemplary embodiment, a protrusion may be formed on the periphery of the exhaust hole 33 in order to reinforce the strength of the support plate 32. However, the present invention is not limited to the above shape or configuration.

In the present exemplary embodiment, the diameter of the terminal hole 35 is greater than the diameter of the electrode terminal 11 inserted into the terminal hole 35 and the diameter of each of the lower fastening members 12a and 12b. As described above, the rechargeable battery 10 located under the protection member 30 has the identification unit 13 located on the periphery of the electrode terminal 11, and the diameter of the terminal hole 35 is relatively greater than the diameter of each of the lower fastening members 12a and 12b to expose at least a portion of the identification unit therethrough. Accordingly, even when the protection member 30 is mounted on the housing 20, the polarity of the electrode terminal 11 of the rechargeable battery 10 can be easily viewed and checked.

Each of the protrusion units 31 formed on the support plate 32 is formed on the peripheries of the terminal holes 35, and thus a portion where the bus bar 40 and lead-out terminals 41a and 41b are fastened is accommodated in the space formed by the protrusion unit 31. The protrusion unit 31 is formed to have the substantially same shape as the fastening portion of the bus bar 40 or the lead-out terminals 41a and 41b. More particularly, the protrusion unit 31 in which the bus bar 40 is accommodated is formed of round portions formed at both edges thereof and a straight portion configured to connect the round portions. The protrusion unit 31 having the fastening portion of the lead-out terminals 41a and 41b accommodated therein is formed to have a round shape.

Through the protrusion unit 31 formed as described above, the fastening portion of the bus bar 40 and the lead-out terminals 41a and 41b may be stably supported and a short between the neighboring bus bars 40 may be substantially prevented.

Meanwhile, a guidance portion is formed on one side of the protrusion unit 31 and configured toward a central portion of the protection member 30 in which the exhaust hole 33 of the support plate 32 is formed. The guidance portion is connected to the electrode terminal 11 and configured to guide an electric wire for measuring current and voltage and to protect the electric wire.

The reinforcement rib 34 protrudes from and extends along the edge of the support plate 32 and functions to supplement the strength of the support plate 32 and to suppress the support plate 32 from being deformed or damaged by external impact, etc.

Referring to FIGS. 1 and 2, the bus bar 40 according to the present exemplary embodiment is accommodated in the space formed by the protrusion unit 31 of the protection member 30 and configured to electrically connect the electrode terminals 11 of the pair of neighboring rechargeable batteries 10 penetrating the terminal holes 35. As described above, the plurality of rechargeable batteries 10 are arranged such that the positive terminals 11a and the negative terminals 11b are alternately oriented in a certain direction (e.g., an x direction) in which the rechargeable batteries 10 are arranged. The positive terminal 11a and the negative terminal 11b are inserted into the pair of respective holes formed in the central portion of the bus bar 40, thereby in series connecting the neighboring rechargeable batteries 10.

Upper fastening members 42 are used to fasten the bus bars 40 and the electrode terminals 11 on the protection member 30. Each of the upper fastening members 42 includes a positive fastening member 42a for fastening the bus bar 40 and the positive terminal 11a and a negative fastening member 42b for fastening the bus bar 40 and the negative terminal 11b. In the present exemplary embodiment, each of the upper fastening members 42 is a nut.

The lead-out terminals 41a and 41b function to externally lead current generated in the battery module 101 and include the positive lead-out terminal 41a connected to the positive terminal 11a and the negative lead-out terminal 41b connected to the negative terminal 11b. As described above, the fastening portion of the lead-out terminals 41a and 41b fastened to the electrode terminal ills accommodated in the space formed by the protrusion unit 31. Furthermore, a connection portion is formed in the protrusion unit 31 on one side in which the guidance portion is not formed. Accordingly, the terminal portions of the lead-out terminals 41a and 41b can be connected externally through the connection portion. Meanwhile, the lead-out terminals 41a and 41b are also fastened to the electrode terminals 11 through the upper fastening members 42a and 42b.

As described above, according to the present exemplary embodiment, the identification units 13 are formed on the peripheries of the electrode terminals 11 of the rechargeable batteries 10 and checked through the terminal holes 35 of the protection member 30. Accordingly, the polarity of the electrode terminal 11 can be identified. Accordingly, whether the rechargeable batteries 10 have been misaligned can be checked before they are connected in series by fastening the bus bar 40. Furthermore, since the protrusion unit 31 is formed in the protection member 30, the bus bar 40 can be supported and a short between the neighboring bus bars 40 can be prevented, thereby being capable of securing stability.

Figure 5:
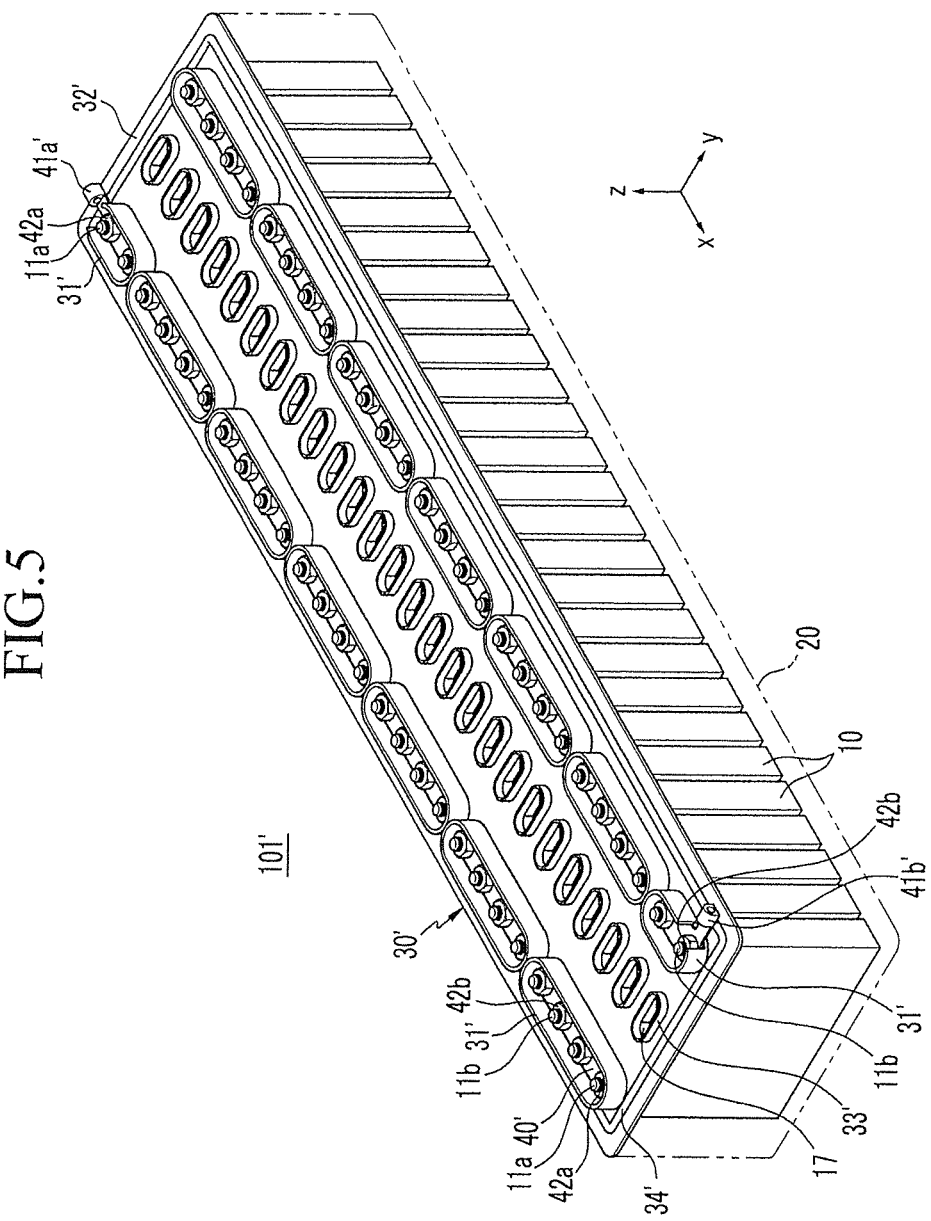
FIG. 5 is a perspective view of a battery module according to another exemplary embodiment of the present invention.

FIG. 5 is a perspective view of a battery module according to an exemplary variation of the present invention.

Referring to FIG. 5, a battery module 101' according to the present exemplary variation includes a plurality of rechargeable batteries 10, a housing 20 configured to accommodate the rechargeable batteries 10, a protection member 30' located on the upper side of the plurality of rechargeable batteries 10, and bus bars 40' configured to connect the plurality of rechargeable batteries 10.

The protection member 30' according to the present exemplary embodiment includes a support plate 32', protrusion units 31' formed on the support plate 32', and a reinforcement rib 34'. Terminal holes into which electrode terminals 11 are inserted and exhaust holes 33' configured to communicate with the vent members 17 of the rechargeable batteries 10 are formed in the support plate 32'. In the present exemplary embodiment, the diameter of the terminal hole is greater than the diameter of the electrode terminal 11 and the diameter of each of the lower fastening members 12a and 12b of the electrode terminal. Accordingly, the polarity of the electrode terminal 11 can be easily identified by checking identification units formed on the rechargeable batteries 10.

In the present exemplary embodiment, the plurality of rechargeable batteries 10 are arranged such that two positive terminals 11a and two negative terminals 11b are alternately oriented in a direction (e.g., an x direction) in which the rechargeable batteries 10 are arranged wherein each of the rechargeable batteries contains identification units as described above with respect to the previous embodiment. Furthermore, each of the protrusion units 31' is formed to surround four terminal holes. Four holes are formed in the bus bar 40' accommodated in space formed by the protrusion unit 31' and configured to connect the four electrode terminals 11.

In such a structure, the two positive terminals 11a and the two negative terminals 11b, respectively, are connected in parallel by a bus bar 40' and then connected in series. Accordingly, the capacity of the battery module may be doubled as compared with the first exemplary embodiment.

In the present exemplary embodiment, lead-out terminals 41a' and 41b' connect the two positive terminals 11a and the two negative terminal 11b in parallel, respectively, and draw current externally. Further, as in the first exemplary embodiment, a guidance portion (e.g. a recess) may be formed in the protrusion unit 31' in order to guide an electric wire for measuring current and voltage.

In the present exemplary embodiment, since the construction of the protection member 30' is modified as described above, the misalignment of the rechargeable batteries 10 in the battery module 101' can be substantially prevented, stability can be secured, and also the battery module 101' of a high capacity can be implemented.

In the present exemplary embodiment, the construction in which the four electrode terminals are connected by the one bus bar 40' is illustrated. However, if the number of electrode terminals connected by one bus bar using the same method is increased, the capacity of a battery module can be further increased.

Figure 6:
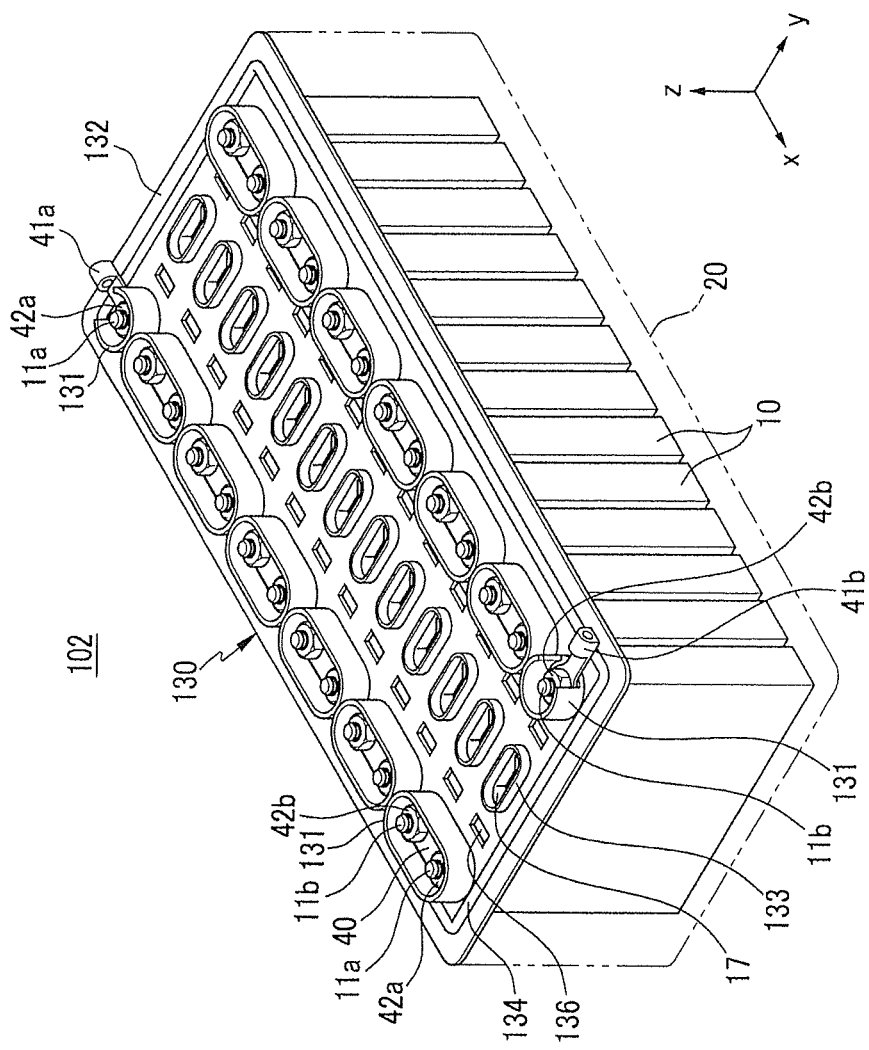
FIG. 6 is a perspective view of a battery module according to yet another exemplary embodiment of the present invention.
Figure 7:
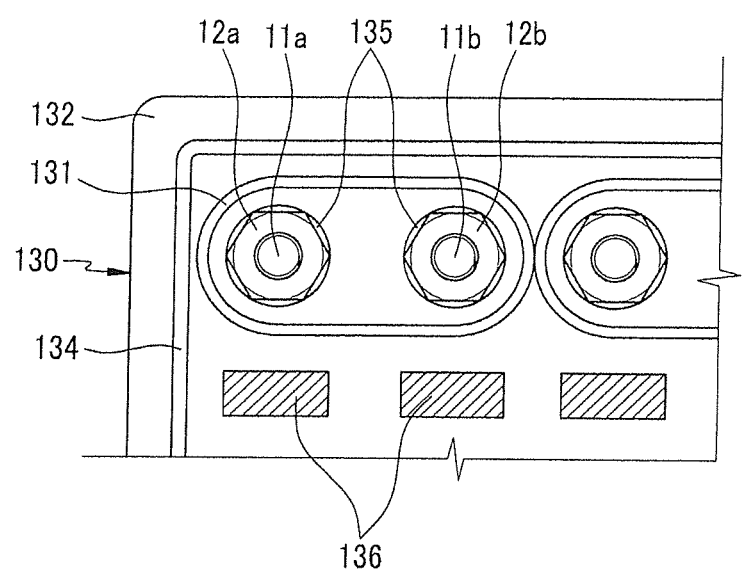
FIG. 7 is a partial top plan view showing a state in which a bus bar is mounted in the battery module according to the exemplary embodiment of the present invention shown in FIG. 6.

FIG. 6 is a perspective view of a battery module according to a second exemplary embodiment of the present invention, and FIG. 7 is a partial top plan view showing a state in which a bus bar is mounted in the battery module according to the second exemplary embodiment of the present invention. A battery module 102 according to the present exemplary embodiment is described with reference to FIGS. 6 and 7. In describing the present exemplary embodiment, the same or similar elements as those of the first exemplary embodiment will be simply described or a description thereof will be omitted.

Referring to FIG. 6, the battery module 102 according to the present exemplary embodiment includes a plurality of rechargeable batteries 10, a housing 20 configured to accommodate the rechargeable batteries 10, a protection member 130 located on the upper side of the rechargeable batteries 10, and bus bars 40 configured to connect the plurality of rechargeable batteries 10.

In the present exemplary embodiment, the plurality of rechargeable batteries 10 are arranged such that positive terminals 11a and negative terminals 11b are alternately oriented in the direction (e.g., an x direction) in which the rechargeable batteries 10 are arranged. The rechargeable batteries 10 further include identification units formed on the peripheries of the electrode terminals 11.

The protection member 130 includes a support plate 132, protrusion units 131 formed on the support plate 132, and a reinforcement rib 134. Each of the protrusion units 131 is formed of round portions formed at both edges thereof and a straight portion configured to connect the round portions. The bus bar 40 is accommodated in space formed by the protrusion unit 131 and fastened and connected to the electrode terminals 11, inserted into the terminal holes, through upper fastening members 42a and 42b.

Referring to FIGS. 6 and 7, terminal holes 135 into which the electrode terminals 11 are inserted and exhaust holes 133 configured to communicate with the vent members 17 of the rechargeable batteries 10 are formed on the support plate 132. In the present exemplary embodiment, the diameter of the terminal hole 135 is substantially identical to the diameter of each of the lower fastening members 12a and 12b of the electrode terminal 11. Accordingly, when the electrode terminal 111s inserted, the electrode terminal 11 can be stably inserted into the protection member 130 and fixed thereto, thereby being capable of reducing errors upon assembly. Furthermore, the rechargeable batteries 10 may be suppressed from being moved relatively to the protection member 130 because of external impact, etc. Accordingly, damage to the rechargeable batteries 10 may be significantly prevented.

If the size of the terminal hole 135 is formed to be substantially identical to the size of each of the lower fastening members 12a and 12b of the electrode terminal 11 as described above, it may be difficult to check the identification unit formed on the periphery of the electrode terminal 11 when the protection member 130 is mounted on the housing 20. In the present exemplary embodiment, in order to solve the problem, windows 136 are formed near the terminal holes 135 so that the identification units can be checked through the windows.

In the present exemplary embodiment, the windows 136 are formed between the protrusion units 131 and the exhaust holes 133. In one embodiment, the windows 136 are close to the terminal holes 135 so that they correspond to the identification units formed on the peripheries of the electrode terminals 11. In the present exemplary embodiment, the windows 136 are illustrated to be formed outside the protrusion units 131 surrounding the terminal holes 135. However, the window 136 may be formed to surround the protrusion unit 131. Alternatively, the protrusion unit 131 may be formed in such a manner that one face of the protrusion unit 131 is opened in the direction of the exhaust hole 133 and the position of the window 136 may be close to the terminal hole 135. Additionally, a guidance portion may be formed in the protrusion unit 131 in order to guide an electric wire for measuring current and voltage.

As described above, in the present exemplary embodiment, the size of the terminal hole 135 is substantially identical to the size of each of the lower fastening members 12a and 12b of the electrode terminal 11. Accordingly, the rechargeable batteries 10 may be stably fixed by the protection member 130. Furthermore, the polarity of the electrode terminal 11 may be identified from the identification unit of the rechargeable battery 10 through the window 136 additionally formed on the protection member 130. Accordingly, any misalignment of the rechargeable batteries 10 can be easily checked.

Additionally, even in the present exemplary embodiment, a battery module having a higher capacity may be constructed by modifying the structures of the protection member 130 and the bus bars 40. For example, a battery module having a double capacity may be constructed by connecting two positive terminals and two negative terminals using one bus bar as shown in FIG. 5.

As described above, the present invention has been described in connection with some exemplary embodiments. However, the present invention is not limited to the exemplary embodiments. The scope of the present invention is defined by the appended claims, and those having ordinary skill in the art will easily understand that the present invention may be modified in various ways without departing from the concept and scope of the claims.

| <Description of symbols> | |
|---|---|
| 101, 101', 102: battery module | 10: rechargeable battery |
| 11: electrode terminal | 12a, 12b: lower fastening member |
| 13: identification unit | 15: casing |
| 16: cap plate | 17: vent member |
| 18: electrolyte solution injection member | 20: housing |
| 30, 30', 130: protection member | 31, 31', 131: protrusion unit |
| 32, 32', 132: support plate | 33, 33', 133: exhaust hole |
| 34, 34', 134: reinforcement rib | 35: terminal hole |
| 136: window | 40, 40': bus bar |
| 41a, 41a', 41b, 41b': lead-out terminal | 42: upper fastening member |

What is claimed is:

1. A battery module comprising:
    a plurality of rechargeable batteries, each of the rechargeable batteries comprising a case, electrode terminals protruding from the case, and an identification unit extending around a periphery of at least one of the electrode terminals;
    a bus bar electrically coupling one electrode terminal of a first battery of the rechargeable batteries and one electrode terminal of a second battery of the rechargeable batteries, wherein the first battery and the second battery are adjacent;
    a protection member located between the rechargeable batteries and the bus bar, wherein the bus bar is on an exterior surface of the protection member; and
    wherein the protection member further comprises protrusion units, wherein one . protrusion unit of the protrusion units extends around a periphery of at least one bus bar on the support plate.

2. The battery module of claim 1, wherein the electrode terminals comprise a positive terminal and a negative terminal, wherein the identification unit comprises a positive identification unit extending around the periphery of the positive terminal and a negative identification unit extending around the periphery of the negative terminal, and wherein the positive identification unit and the negative identification unit are different colors or have different patterns from each other.

3. The battery module of claim 1, wherein the electrode terminals comprise a positive terminal and a negative terminal, and the identification unit extends around the periphery of only one of the positive terminal and the negative terminal.

4. The battery module of claim 1, wherein the identification unit comprises adhesive tape.

5. The battery module of claim 1, wherein the protection member comprises a support plate covering a face of each of the rechargeable batteries and a plurality of terminal holes, wherein at least one of the electrode terminals penetrates one of the terminal holes.

6. The battery module of claim 5, wherein the protection member further comprises a reinforcement protrusion extending adjacent an edge of the support plate.

7. The battery module of claim 5, wherein the support plate has exhaust holes that each communicate with at least one vent member on each of the rechargeable batteries.

8. The battery module of claim 5, wherein the terminal hole has a greater diameter than a diameter of each of the electrode terminals and a terminal fastening member fastening the electrode terminal to the support plate.

9. The battery module of claim 5, wherein the support plate has a window adjacent to the terminal holes.

10. The battery module of claim 9, wherein the window generally corresponds to one of the identification units.

11. The battery module of claim 1, wherein:
    the electrode terminals comprise a positive terminal and a negative terminal, and the positive terminal of a first battery of the rechargeable batteries and the negative terminal of a second battery of the rechargeable batteries adjacent to the first battery are adjacent to each other.

12. The battery module of claim 11, wherein the bus bar electrically connects the positive terminal of the first battery and the negative terminal of the second battery.

13. The battery module of claim 1, wherein:
    the electrode terminals comprise a positive terminal and a negative terminal, and
    wherein the plurality of rechargeable batteries are arranged such that the positive terminal of a first two adjacent ones of the rechargeable batteries are adjacent to each other and the negative terminal of a second two adjacent ones of the rechargeable batteries are adjacent to each other.

14. The battery module of claim 13, wherein the bus bar electrically connects the positive terminals and the negative terminals of the first two and the second two rechargeable batteries.

15. The battery module of claim 1, further comprising fastening members fastening the bus bar and the electrode terminals and lead-out terminals electrically coupled to the electrode terminals and configured to draw current out externally.

16. The battery module of claim 1, further comprising a housing having an opening accommodating the rechargeable batteries therein, wherein the protection member generally covers the opening.

* * * * *